Jan. 4, 1927. 1,612,802
J. W. DELL
DIRIGIBLE HEADLIGHT FOR AUTOMOBILES
Filed Dec. 14, 1925 2 Sheets-Sheet 1

Inventor
John W. Dell.
By Clarence A. O'Brien
Attorney

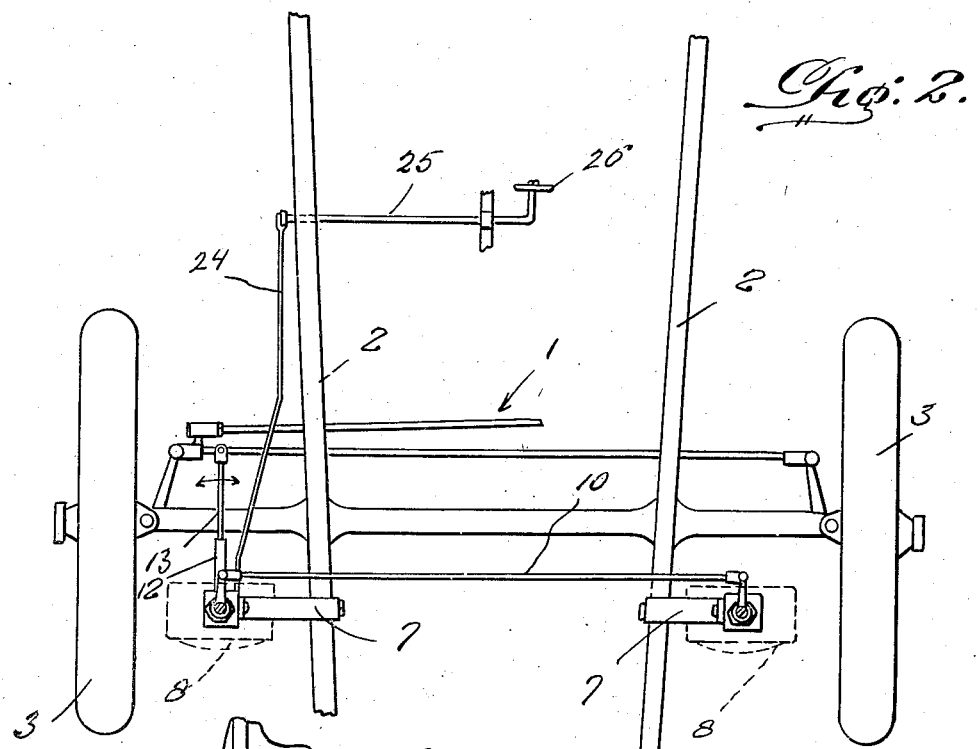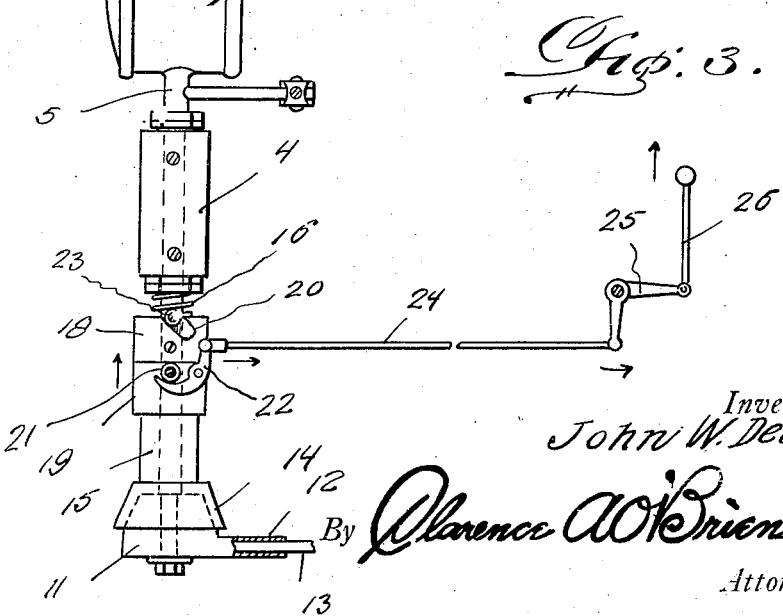

Patented Jan. 4, 1927.

1,612,802

UNITED STATES PATENT OFFICE.

JOHN W. DELL, OF OZARK, MICHIGAN.

DIRIGIBLE HEADLIGHT FOR AUTOMOBILES.

Application filed December 14, 1925. Serial No. 75,307.

This invention relates to an improved dirigible headlight structure for automobiles and other similar vehicles.

My principal object is to provide a structure of this class which is such as to automatically turn the headlight, through the medium of the usual steering gear, so that the rays of light projected will be substantially parallel with the front wheels at all times. In this way when the vehicle is traveling on a straight road, the lights will be straight ahead, and when a turn is made in the road, the light beams will follow and remain substantially parallel with the front wheels instead of being projected off of the road as is the case with the ordinary rigidly mounted headlights.

Briefly, the invention has reference to a pair of suitably supported bearings on the front portion of the vehicle, the headlight standards being rotatably mounted in these bearings, and there being a connection between the two standards so that they will be simultaneously operated. Associated with the lower end of one of the standards, which is comparatively long, is a crank arm which is moved transversely of the machine in a horizontal plane from a connection with the steering gear. Obviously, then, when the steering gear is operated, the headlight standards will be oscillated or partially rotated to swing the headlights, on the upper ends, with the front wheels.

An important feature of the present invention is the provision of novel means for permitting independent rotation of the standards, and headlights, this means including a clutch which may be utilized to disconnect the standards from the steering gear operating means, whereby to permit the headlights to be turned independent of the front wheels and to permit the device to be used as a safety appliance even when travelling on a straight path of travel.

An equally important object is to generally improve upon devices of this class by providing one of comparative simplicity and durability which is practical, positive in operation, easy to apply and such that it does not require expensive alterations of the different parts of conventional automobiles.

Other objects and advantages of the invention will become apparent from the following description and drawings:—

In the accompanying drawings forming a part of this application, and in which like numerals are employed to designate like parts throughout the same:—

Figure 1:
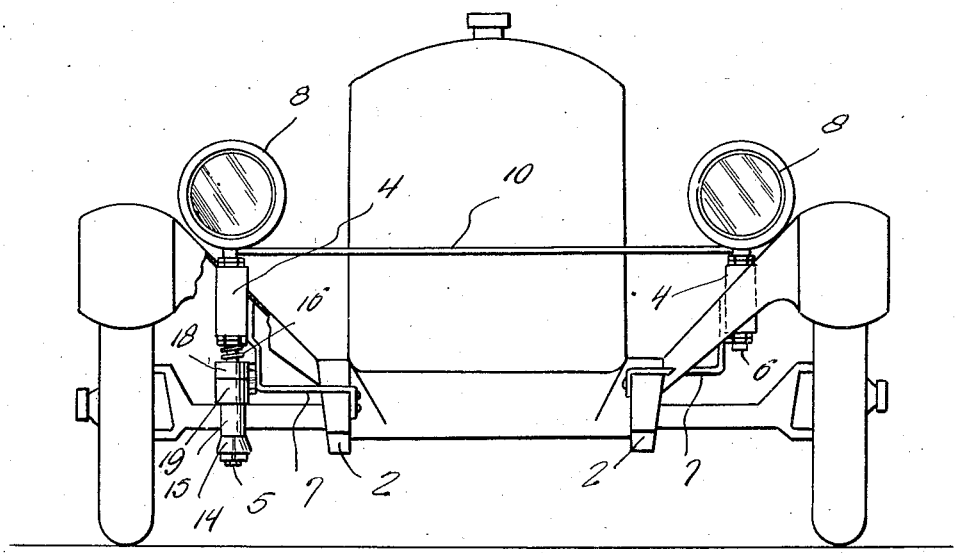
Figure 4:
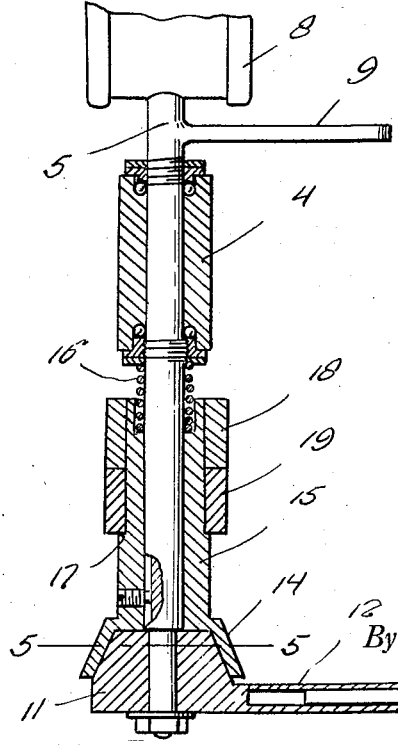
Figure 5:
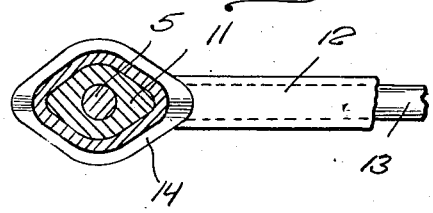

Figure 1 is a front elevation with portions broken away, of a part of a conventional form of automobile, showing the improved dirigible headlight structure associated therewith, Fig. 2 is a top plan view showing the general arrangement in a diagrammatic manner, Fig. 3 is side view of the clutch structure and operating means therefor, showing only one of the headlight standards and lights thereon, Fig. 4 is a sectional view showing the structure of Fig. 3 more in detail, Fig. 5 is a cross section taken approximately on the plane of the line 5—5 of Fig. 4, looking downwardly.

Referring to Fig. 2, a conventional steering gear is indicated by the reference characters, the parallel chassis bars by the reference 2, the front wheels by the reference characters 3.

In Fig. 1, the bearings 4 are shown. A relatively long standard 5 is supported in the left hand bearing and a relatively short one 6 in the remaining bearing. Both bearings are supported from right angular supporting brackets 7 fastened upon the chassis bars 2. It will be noted that the left hand supporting bracket is specially constructed for a purpose to be hereinafter described.

Both of the standards carry the usual lamps 8 at their upper ends. Moreover the standard 5 is provided with a rearwardly extending crank arm 9 with which a connecting rod 10 is associated. The other standard is provided with a like crank arm (not shown) on the other standard. Hence both standards turn as a unit.

Directing attention now to Figs. 3 and 4 more particularly, it will be seen that the lower end of the standard 5 is reduced and is freely rotatable in an opening in a clutch head 11 on the forward end of a tube 12. Telescopically received in this tube is an arm 13 which is connected to the steering gear as shown in Fig. 2. Owing to this free connection of the clutch head to the standard, it is necessary to provide cooperating clutch means in order to impart rotation to the standard. At this time, I might state that the clutch is of the configuration indicated plainly in Fig. 5. Hence a correspondingly shaped complemental clutch member 14 cooperates therewith, this member being on the lower end of a vertically extending bushing 15 through and beyond which the standard extends. The bushing is slidably keyed to the standard as indicated in Fig. 4. Moreover, the bushing is formed at the top with a socket in which a coiled spring 16 is received, and the intermediate portion is shouldered as indicated at 17.

Supported on the shoulder part of the bushing in superposed relation are upper and lower collars 18 and 19, the upper one of which terminates flush with the upper end of the bushing. Directing attention to Fig. 3, it will be seen that the upper collar is provided at one side with a cam slot or notch 20 and that the lower collar carries a laterally extending roller 21. Cooperating with this roller is a lifting finger 22 which is pivotally mounted on the adjacent supporting bracket 7 as indicated diagrammatically in Fig. 1. Also mounted on this bracket and above the roller 21 is a second smaller roller 23 which cooperates with the cam slot. An operating rod 24 is connected with the lifting finger 22 and is in turn connected with a bell crank 25 mounted in any appropriate way.

The bell crank is operated by a control lever or lift 26 located in convenient reach of the operator in the front part of the automobile. Under normal conditions the spring 16 holds the unit, composed of parts 15, 18 and 19, down, so that the clutch member 14 is engaged with a complemental clutch head 11. Obviously, then, when the steering gear is operated in steering the front wheels, it will simultaneously actuate the dirigible headlight structure so that the lamps 8 will turn with the front wheels. The structure will be relieved of unusual shocks and jars by the sliding connection between the parts 12 and 13, (see Figs. 4 and 5).

Should the operator desire to turn the lamps independent of the front wheels while traveling on a straight road in order to throw rays of light to one side of the road, this may be done by disengaging the clutch. To do this, it is necessary to pull upon the parts 26 to operate the bell crank. In so doing, the operating rod 24 actuates the lifting finger 22 which in turn engages the roller 21 and lifts upon the two sleeves and bushing together with the clutch element 14. The clutch is thus disengaged and during this upward lift, the cam slot 20 and roller 23 produce a cam action which serves to rotate the shaft or standard 5. The direction of movement will be toward the outer side of the path of travel and in this way the rays of light may be thrown off of the road to prevent them from interfering with the vision of an oncoming driver.

It is believed that the construction and method of operation and advantages derived from an invention of this kind will be plain to those skilled in the art after considering the description in connection with the drawings. Therefore a more lengthy description is thought unnecessary.

Minor changes coming within the field of invention claimed may be resorted to if desired.

Having thus described my invention, what I claim as new is:

1. In a dirigible headlight structure of the class described, a supporting structure, a bearing mounted on said structure, a headlight standard journaled for rotation in said bearing, an operating connection associated with the lower end of the standard and adapted to be connected to a part of a vehicle steering gear; said connection including a part provided with a clutch head having a bore extending therethrough, the lower end of said standard having a portion rotatably mounted in said bore, a bushing surrounding said standard and slidably keyed thereto, said bushing being provided at its lower end with a clutch socket in which said head is received, upper and lower sleeves mounted on said bushing, cam co-acting means between the upper sleeve and standard, a pivotally mounted cam finger, and an operating connection between the lower sleeve and said finger.

2. In a dirigible headlight structure of the class described, a supporting structure, a bearing mounted on said supporting structure, a headlight standard journaled for rotation in said bearing, a clutch element associated with the lower end of said standard, a bushing surrounding the standard and slidably keyed thereto, said bushing being provided with a complemental clutch element cooperative with the first-named element, said bushing being shouldered, upper and lower sleeves surrounding the bushing and resting upon the shoulder, cam co-acting means between the upper sleeve and standard, a pivotally mounted finger, a roller carried by and extending outwardly from the lower sleeve and engageable with said finger, and operating means for said finger.

In testimony whereof I affix my signature.

JOHN W. DELL.